Patented Aug. 19, 1952

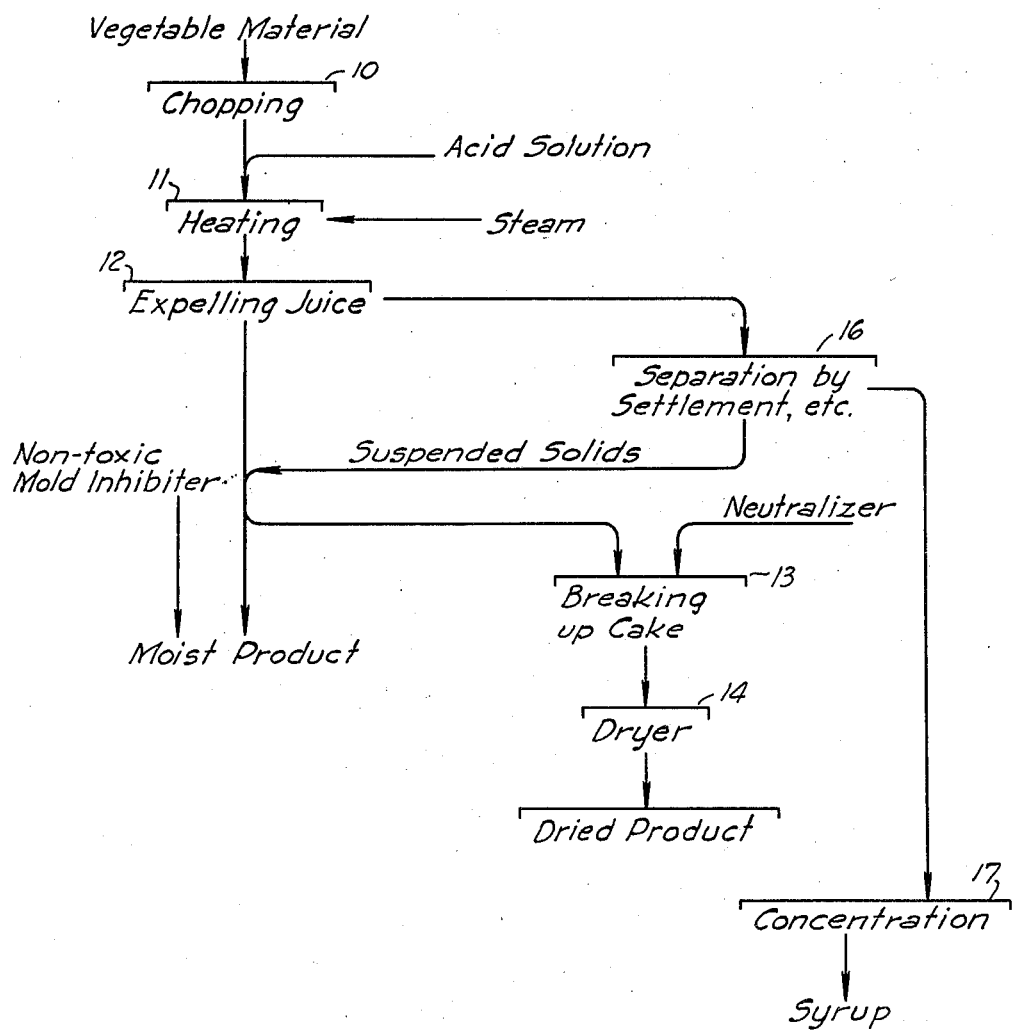

2,607,688

UNITED STATES PATENT OFFICE 2,607,688

VEGETABLE TREATMENT PROCESS

David D. Peebles, Hillsborough, Paul D. Clary, Jr., Petaluma, and Richard K. Meade, Santa Rosa, Calif., assignors to Western Condensing Company, San Francisco, Calif., a corporation of California Application February 1, 1949, Serial No. 73,933

5 Claims. (Cl. 99—8)

This invention relates generally to processes for forming marketable products from various vegetable materials, particularly the green leafy portions of succulent plants, such as alfalfa, grasses, beet tops and the like, and to products resulting from such processes.

It has long been known that certain important nutrients, such as carotin, contained in fresh alfalfa and like materials, deteriorate rapidly after the material is cut in the field. The drying of such material has been found to be particularly detrimental, due presumably to oxidation at the drying temperatures employed. Sun drying likewise rapidly deteriorates the carotin content, presumably because of photo-chemical destruction. In a typical instance conventional drying of chopped fresh green alfalfa affords a dried product which has a carotin content equivalent to about 65% of the original carotin value. Upon storage of this dried material in bags under normal conditions, the carotin content continues to fall off rapidly, and in a typical instance 90 days after drying the carotin content will be about 60% of the original carotin value in the dried product.

Various efforts have been made to use vitamin preservatives in the drying of alfalfa and like materials, but such efforts have not proven successful, and the chemicals employed have been relatively expensive. The procedure of drying the alfalfa by conventional methods is of itself a relatively expensive operation, and in fact the cost is such that with certain leafy materials, such as beet tops, the expense involved does not warrant processing.

It is an object of the present invention to provide a practical process for the treatment of vegetable materials such as alfalfa, grasses, beet tops and the like, which will provide marketable products of high nutritive value at relatively low cost.

Another object of the invention is to provide a process which enables expressing the juice from the vegetable material by pressure, while at the same time retaining substantially all of the carotin with the fibrous solids.

A further object of the invention is to provide novel products resulting from the above process.

Additional objects of the invention will appear from the following description in which the preferred embodiments have been set forth in detail in conjunction with the flow sheet of the accompanying drawing.

As previously stated the present invention makes use of the green leafy portions of succulent plants which are relatively rich in carotin, such as alfalfa, grasses, beet tops and the like. Particular reference will be made herein to alfalfa, with the understanding that the same procedure can be applied to the other vegetable materials.

We have found that the carotin content of alfalfa commences to deteriorate immediately after cutting in the field, and therefore it is desirable that processing follow field cutting as quickly as possible.

Our processing involves acidulating the vegetable material, together with heat treatment, which according to our discovery makes possible several important new results. Following this treatment the material is subjected to pressure to expel a large percentage of the water content. The resulting moist fibrous material can be sold as such for use as a stock feed, or after neutralization it may be dried to form a final dried product for marketing. The expelled juice can be separately processed as will be presently explained.

A better understanding of the process can be had by explanation of the accompanying flow sheet of the drawing. The vegetable material (e. g. fresh green alfalfa) supplied to this process can be subjected to a chopping operation 10, which can be carried out by the use of known types of chopping equipment to reduce the size of the material to fragments of convenient size. The material from the chopping operation 10 is then intermixed with a suitable acid solution as illustrated, and the acidulated material heated to an elevated temperature at 11. After operation 11 the material passes to the expelling operation 12, where it is placed under mechanical pressure as by means of a suitable expeller press of the feed screw type, to press out a large percentage of the water content. The resulting moist press cake is shown being intermixed with a suitable mold inhibiter for final marketing. A part of this press cake however is shown being supplied to the operation 13, where it is intermixed with a suitable neutralizer and the cake broken up in such form as to be suitable for drying. It is then subjected to the conventional drying operation 14 for producing a final dried product.

The juice expelled from operation 12 is shown being supplied to the separating operation 16, which may for example be a conventional settling tank with a conical bottom, and the suspended solids thereby separated out are returned to the press cake as indicated. The juice removed from operation 16 can be concentrated at 17 and utilized as a separate product, or part or all of this material can be blended with the dried material from 14, after grinding, to form a moist meal.

Various acids can be used for operation 10, provided however that it should be non-toxic, and should not result in the formation of any objectionable by-products. Sulphuric acid has given satisfactory results although it is possible to use other acids such as hydrochloric, lactic, phosphoric and acetic. In general good results have been secured by adding sufficient acid to produce a hydrogen ion concentration of at least pH 6.5, and preferably within the limits of about from pH 5.5 to 6.5. Heating is to a temperature of at least about 160° F. and preferably between temperature limits of about from 160° to 212° F. This temperature is held for an appreciable period of time, such as from 3 to 6 minutes. A further period of time retention can be used if desired, but care should be taken to avoid use of such temperatures and time periods as may cause burning or impairment of quality. In general use of higher temperatures enables use of lesser acidity to produce the results desired.

Generally it is desirable to add the acid as a dilute aqueous solution, as for example an aqueous solution containing 2% sulphuric acid by weight. In practice it is desirable to use a screw or like conveyor for moving the material from the chopping operation 10 to the expeller 12. The acid solution is introduced into this conveyor, near the inlet end of the same, and steam is introduced into the material throughout the length of the conveyor to heat the same to the desired temperature. With the addition of the acid solution the material is in slurry form, and is supplied as such to the expelling operation.

Assuming treatment of chopped alfalfa and the addition of a 2% aqueous solution of sulphuric acid, in a typical instance 1.25 lbs. of sulphuric acid can be used for the treatment of 1 ton of chopped alfalfa. These proportions will afford a hydrogen ion concentration of the resulting slurry of about pH 5.5. In this particular example the material was heated to 212° F., and the retention time was 3 minutes.

The expelling operation 12, as previously stated, can be carried out by the use of conventional types of rotary feed screw expellers. As will be presently explained in greater detail, because of acidulation and heat treatment of the alfalfa, the juice pressed from the material in the expelling operation carries a minimum amount of carotin containing solids. Furthermore soluble solids can be expressed from this material relatively easily, compared to expressing juice solids from ordinary chopped green alfalfa without acidulation and heat treatment. It is desirable to supply heat to the expeller used for operation 12, whereby the material remains at about the same temperature to which it is heated in operation 11, while juice is being expelled.

The non-toxic mold inhibitor which can be introduced into the moist press cake from operation 12, where this product is to be sold as such, may be propionic acid. The press cake may for example contain from 40 to 50% moisture, and 1.5 lbs. of the propionic acid can be added per ton of original alfalfa treated.

With respect to that part of the press cake which may be dried, the neutralizer added at 13 should be such that it is non-toxic and should not result in any objectionable by-products. Thus assuming for example that sulphuric acid is used in operation 11, the neutralizer can be ordinary lime. The amount of neutralizer added should be such as to produce a hydrogen ion concentration of about pH 6.5 to 7.5.

We have discovered that acidulating the material and its heat treatment, as described above, causes the carotin to remain largely with the fibrous material in the expelling operation 12, leaving only a minor part of the carotin to be removed with the juice. It appears that this is due to coagulation of the vegetable protein present, and that such coagulation retains the majority of the carotin, thus preventing the carotin from passing out with the expressed juice.

In a typical instance from 90 to 95% of the carotin remains with the fiber, with only from 5 to 10% passing out with the juice. When chopped alfalfa is directly subjected to an expelling operation carried out in the same manner, from 35 to 50% of the carotin content passes out with the juice, and from 50 to 65% remains with the fiber.

In addition to modifying the protein present so that the carotin remains largely with the fiber, the operation 11 conditions the fibrous portion of the vegetable material so that it is more amenable to removal of juice by a mechanical expelling operation. In other words the expelling operation can be carried out more rapidly with a higher percentage of water removal.

The moist press cake, as previously stated, can be sold as such for use as a stock feed. The acid content of this material is not objectionable.

If the moist press cake from the operation 12 were directly dried without neutralizing, the carotin content would deteriorate. However, after neutralization as previously described, drying can be carried out without serious impairment of the carotin content. Thus this dried material likewise has a relatively high carotin content, compared to conventionally dried alfalfa, and it can be used in place of conventional alfalfa as a stock feed.

An example of our process is as follows: The green alfalfa being processed contained 21.5% solids, and a carotin content of 26.7 milligrams per 100 grams (dry solids basis). After chopping it was mixed with a 2% solution of sulphuric acid in proportions which provided a resulting hydrogen ion concentration of pH 6.5. The material was then heated to 212° F. by contact with steam and retained at this temperature for a period of 3 minutes. It was then treated in an expeller whereby juice was expelled, leaving a press cake containing 45% solids. The expressed juice contained 4.6% solids, and had a carotin content of 4.8 milligrams per 100 grams (dry solids basis). The press cake was then dried by contact with hot air at a temperature of about 650° F. The finished dried product contained 97% solids and had a carotin content of 27 milligrams per 100 grams (dry solids basis). Thus 90% of the original carotin content remained with the fiber.

In order to inhibit deterioration of the carotin in alfalfa after field cutting and before processing, we can contact the freshly cut material with a preservative, particularly a dilute ammonia-water solution. Thus a 2% solution of aqua-ammonia can be sprayed on the alfalfa immediately after field cutting, to the extent of say 200 lbs. of solution for each ton of green alfalfa.

It will be evident from the foregoing that we have provided a process which can be employed for producing marketable products from vegetable materials such as alfalfa, with a minimum loss of carotin content, and without using conventional drying upon the initial bulk material. The expelling operation 12 is a relatively simple one to carry out upon the material, compared to the use of conventional dryers. When the moist press cake is sold as such, there is no further drying required. Assuming that one wishes to produce a final dried product, the drying operation 14 need remove only a relatively small amount of water, compared to the water contained in the original material, and therefore this drying is not expensive compared to conventional operations.

We claim:

1. In a process for the treatment of succulent vegetable materials containing carotin, contacting the same with an acid solution such that the wetted material has a hydrogen ion concentration of at least as low as pH 6.5, heating the material to an elevated temperature of at least 160° F., and then applying pressure to the material to express juice therefrom.

2. In a process for the treatment of succulent vegetable material containing carotin, contacting the material with an acid solution such that the wetted material has a hydrogen ion concentration of the order of pH 5.5 to 6.5, heating the material to an elevated temperature of the order of 160° F. to 212° F., and then applying mechanical pressure to the material to express juice therefrom.

3. In a process for the treatment of succulent vegetable material containing carotin, contacting the material with an acid solution to provide a hydrogen ion concentration of the order of at least about pH 6.5, heating the material to an elevated temperature of the order of at least about 160° F., applying mechanical pressure to the material to expel juice therefrom, neutralizing the press cake, and then drying the press cake to form a final dried material.

4. In a process for the treatment of succulent vegetable materials containing carotin, the steps of coagulating the protein of the material by acidulating and heating the same, and then applying pressure to the material to express juice from the remaining fibrous material, the coagulating step serving to cause the majority of the carotin to be retained by the fibrous material.

5. In a process to preserve the carotin content in the green leafy portions of succulent plants having a substantial amount of uncoagulated protein, the steps of reducing said portions to fragments of smaller size, adding an acid solution to provide a pH value within the limits of about 6.5 to 5.5, heating said mixture to an elevated temperature of from about 160° F. to 212° F. to effect coagulation and retentive association of protein with the fibrous material present, and then removing the juice and solution from the remaining fibrous material by pressing, the majority of the carotin content being retained by the fibrous material in association with the coagulated protein.

DAVID D. PEEBLES.
PAUL D. CLARY, Jr.
RICHARD K. MEADE.

REFERENCES CITED

The following references are of record in the file of this patent:

UNITED STATES PATENTS

| Number | Name | Date |
|---|---|---|
| 1,257,423 | Thatcher | Feb. 26, 1918 |
| 1,816,998 | Cushman | Aug. 4, 1931 |
| 1,935,754 | Virtanen | Nov. 21, 1933 |
| 2,078,537 | Hanglein et al. | Apr. 27, 1937 |
| 2,213,127 | Kerschbaum et al. | Aug. 27, 1940 |
| 2,334,059 | Bauer et al. | Nov. 9, 1943 |
| 2,346,072 | Haskell | Apr. 4, 1944 |
| 2,353,333 | Harris | July 11, 1944 |
| 2,363,864 | Horvath | Nov. 28, 1944 |

FOREIGN PATENTS

| Number | Country | Date |
|---|---|---|
| 293,779 | Great Britain | of 1928 |